US012003658B2

(12) United States Patent
Nakamura

(10) Patent No.: US 12,003,658 B2
(45) Date of Patent: Jun. 4, 2024

(54) INFORMATION PROCESSING APPARATUS, STORAGE MEDIUM, AND INFORMATION COMMUNICATION METHOD

(71) Applicant: Casio Computer Co., Ltd., Tokyo (JP)

(72) Inventor: Fuminobu Nakamura, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 130 days.

(21) Appl. No.: 17/683,092

(22) Filed: Feb. 28, 2022

(65) Prior Publication Data
US 2022/0311860 A1    Sep. 29, 2022

(30) Foreign Application Priority Data

Mar. 15, 2021  (JP) ................................ 2021-041138
Dec. 2, 2021   (JP) ................................ 2021-196203

(51) Int. Cl.
*H04M 1/72415* (2021.01)
*B64C 39/02* (2023.01)
*H04M 1/72409* (2021.01)

(52) U.S. Cl.
CPC ..... *H04M 1/724095* (2022.02); *B64C 39/024* (2013.01); *H04M 1/72415* (2021.01); *B64U 2201/20* (2023.01)

(58) Field of Classification Search
CPC ....... H04M 1/724095; H04M 1/72415; H04M 1/72412; H04M 1/72448; B64C 39/024;

(Continued)

(56) References Cited

U.S. PATENT DOCUMENTS

2015/0347010 A1  12/2015 Yang et al.
2016/0035311 A1*  2/2016 Ryo .................. H04M 1/72412
                                                     455/557

(Continued)

FOREIGN PATENT DOCUMENTS

JP   2002-223475 A    8/2002
JP   2012060494 A     3/2012

(Continued)

OTHER PUBLICATIONS

Japanese Notice of Reasons for Refusal dated Jul. 4, 2023, for the corresponding Japanese Patent Application No. 2021-196203, 11 pages. (With English Translation).

(Continued)

*Primary Examiner* — Angelica Perez
(74) *Attorney, Agent, or Firm* — Seed IP Law Group LLP

(57) ABSTRACT

To provide an information processing apparatus, a program, and an information communication method capable of determining notification contents according to the status of operation of a program. A user terminal includes a communication processing unit that communicates with external electronic equipment and a control unit that performs, for the subject unit, operation determination on whether a predetermined program for outputting an image or sound is operated. Based on an operation determination result, the control unit switches the form of information to be transmitted to the electronic equipment via a communication unit, or stops information transmission to the electronic equipment.

11 Claims, 11 Drawing Sheets

(58) Field of Classification Search
CPC ...... B64U 2201/20; H04W 4/12; H04W 4/16; H04W 4/80; H04W 4/02; H04B 1/3827
See application file for complete search history.

(56) References Cited

U.S. PATENT DOCUMENTS

2017/0069179 A1* 3/2017 Aoki ................. H04L 67/55
2019/0086919 A1* 3/2019 Zhang ................ G05D 1/0016

FOREIGN PATENT DOCUMENTS

| JP | 2014-176055 A | 9/2014 |
| JP | 2017021445 A | 1/2017 |
| JP | 2017049973 A | 3/2017 |
| JP | 2017-123598 A | 7/2017 |
| JP | 2017174455 A | 9/2017 |
| WO | 2006/040794 A1 | 4/2006 |
| WO | WO 2014136564 A1 | 9/2014 |

OTHER PUBLICATIONS

Japanese Notice of Reasons for Refusal dated Oct. 31, 2023 for the corresponding Japanese Patent Application No. 2021-196203, 4 pages. (With English Translation.

* cited by examiner

INFORMATION PROCESSING APPARATUS, STORAGE MEDIUM, AND INFORMATION COMMUNICATION METHOD

CROSS-REFERENCE TO RELATED APPLICATIONS

This application is based on and claims the benefit of priority from Japanese Patent Application Nos. 2021-041138, filed on 15 Mar. 2021 and 2021-196203, filed on 2 Dec. 2021, the contents of which are incorporated herein by reference.

The present disclosure relates to an information processing apparatus, a storage medium, and an information communication method.

BACKGROUND

For example, Japanese Unexamined Patent Application, Publication No. 2002-223475 describes a technique regarding a configuration capable of determining, from a watch, the necessity of data transfer via near field communication when a mobile phone receives data etc. and displaying the data on an LCD (a screen) of the watch in the case of performing the data transfer.

SUMMARY

An information processing apparatus as an embodiment includes a transceiver that communicates with external electronic equipment and a processor that performs, for the information processing apparatus itself, operation determination on whether a first program for outputting an image or sound is operated. Based on an operation determination result, the processor switches the form of information to be transmitted to the electronic equipment via the transceiver or stops information transmission to the electronic equipment.

DETAILED DESCRIPTION

Hereinafter, an embodiment will be described using the drawings.

<Information Communication System>

Figure 1:
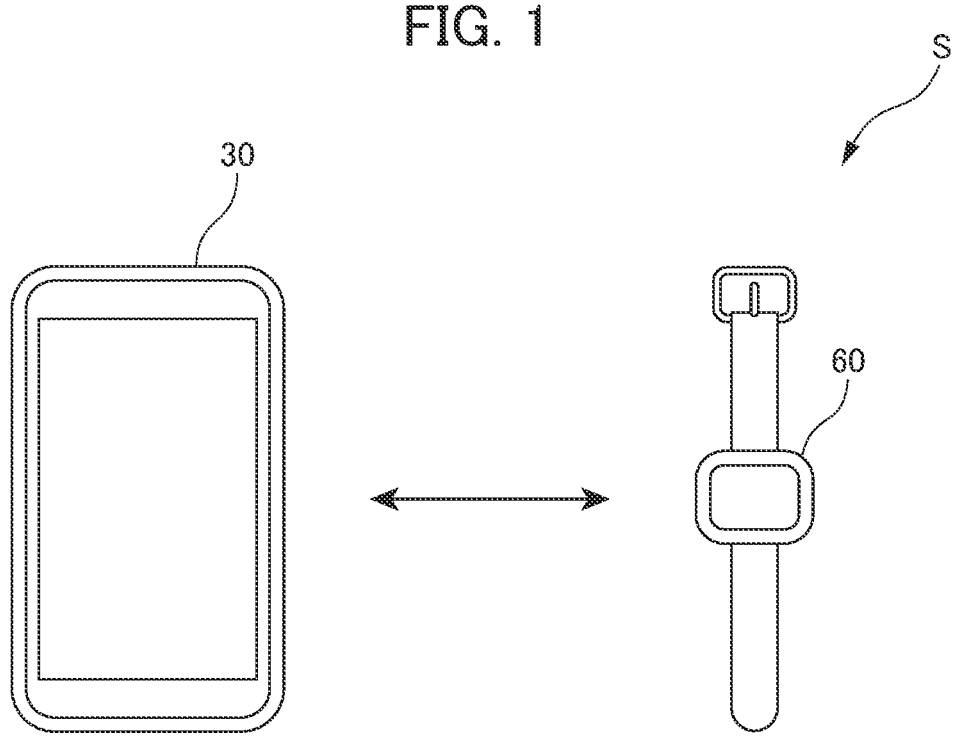
FIG. 1 is a schematic diagram of an information communication system to which a user terminal and a wearable terminal according to one embodiment are applied.

The outline of an information communication system S will be described. FIG. 1 is a schematic view of the information communication system S to which a user terminal 30 and a wearable terminal 60 according to the embodiment are applied. Note that the system described herein means an entire apparatus including a plurality of apparatuses, a plurality of sections, etc. The user terminal 30 is, for example, a portable computer such as a smartphone or a tablet. The wearable terminal 60 is, for example, a wearable information processing apparatus such as a smart watch.

The information communication system S of the present embodiment includes the user terminal 30 and the wearable terminal 60 performing communication processing. The user terminal 30 can receive text information such as a mail from external electronic equipment via a network 1 such as the Internet. Moreover, the user terminal 30 exchanges various types of information via near field communication by pairing with the wearable terminal 60.

<User Terminal>

Figure 2:
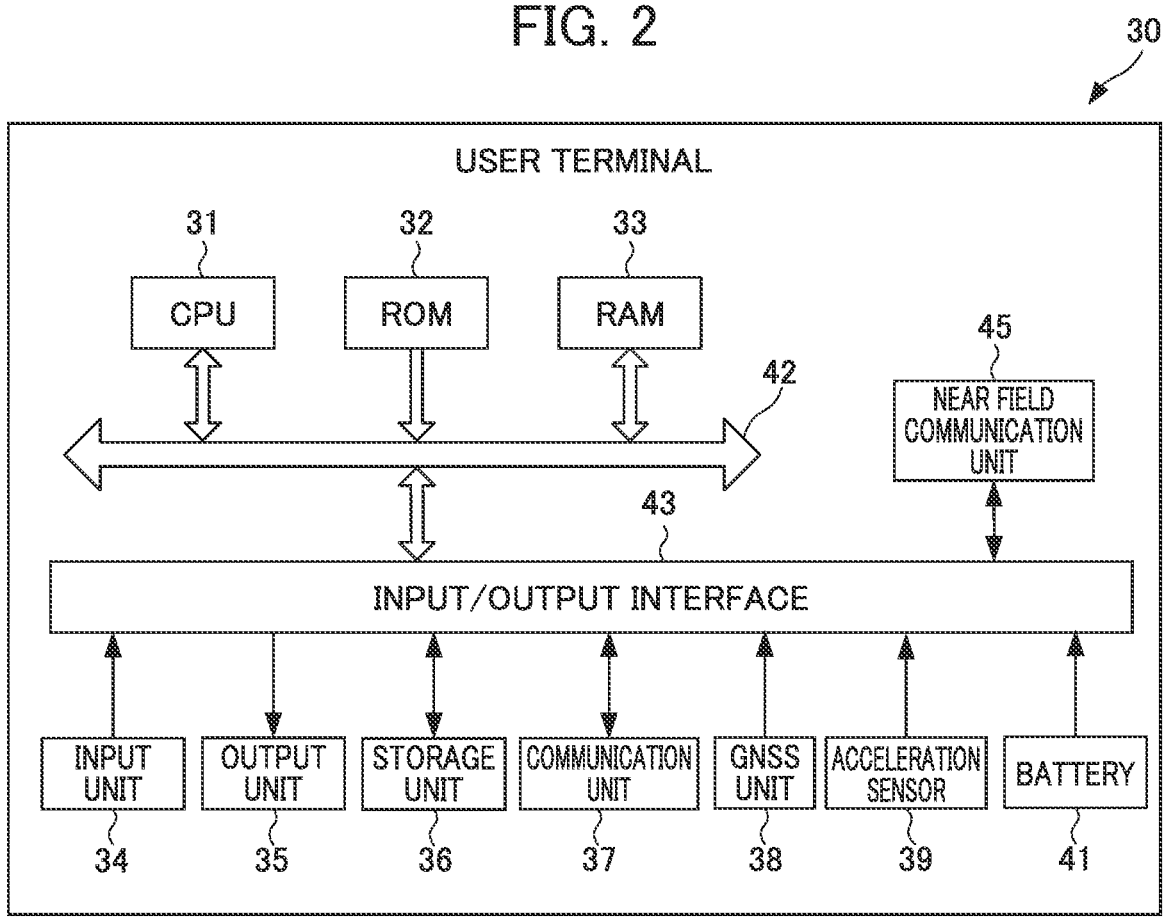
FIG. 2 is a block diagram showing a hardware configuration of the user terminal according to one embodiment.

Next, one example of the user terminal 30 will be described. FIG. 2 is a block diagram showing a hardware configuration of the user terminal 30 according to the embodiment.

As shown in FIG. 2, the user terminal 30 is a computer including a central processing unit (CPU) 31, a read only memory (ROM) 32, a random access memory (RAM) 33, a bus 42, an input/output interface 43, an input unit 34, an output unit 35, a storage unit 36, a communication unit 37, a GNSS unit 38, an acceleration sensor 39, a battery 41, and a near field communication unit 45.

The CPU 31, the ROM 32, and the RAM 33 are connected to each other via the bus 42. The CPU 31 executes various types of processing according to programs recorded in the ROM 32 or programs loaded into the RAM 33.

The bus 42 is also connected to the input/output interface 43. The input unit 34, the output unit 35, the storage unit 36, the communication unit 37, the GNSS unit 38, the acceleration sensor 39, the battery 41, and the near field communication unit 45 are connected to the input/output interface 43.

The input unit 34 and the output unit 35 are user interfaces electrically connected to the input/output interface 43 in a wired or wireless manner. The input unit 34 includes, for example, a keyboard, a mouse, etc., and the output unit 35 includes a display that displays an image, a speaker that amplifies sound, etc. Note that the output unit 35 and the input unit 34 may be configured such that a display function and an input function are integrated with each other as in a touch panel.

The storage unit 36 is an apparatus including a semiconductor memory such as a dynamic random access memory (DRAM) and saving various types of data on the user terminal 30.

The communication unit 37 is an apparatus allowing the CPU 31 to communicate with other computers via a network such as the Internet.

The GNSS unit 38 is a positioning information acquisition unit that acquires location information. GNSS is an abbreviated expression for a global navigation satellite system, and the GNSS unit 38 utilizes a satellite positioning system such as a GPS. The GNSS unit 38 includes an antenna to specify the location of the GNSS unit 38 itself by positioning based on positioning satellite signals transmitted from a plurality of positioning satellites.

The acceleration sensor 39 is an apparatus that detects movement and an acceleration in an optional direction. For example, the acceleration sensor 39 is a capacitive or piezoresistive triaxial sensor, and detects an acceleration in each of three axial directions.

The battery 41 supplies power to the user terminal 30. For example, the battery 41 includes a lithium ion battery.

The near field communication unit 45 is an apparatus that communicates with the wearable terminal 60. The near field communication unit 45 communicates with the wearable terminal 60 by a communication method based on a communication standard such as Bluetooth (the registered trademark) Low Energy (BLE) or Wireless Fidelity (Wi-Fi).

Figure 3:
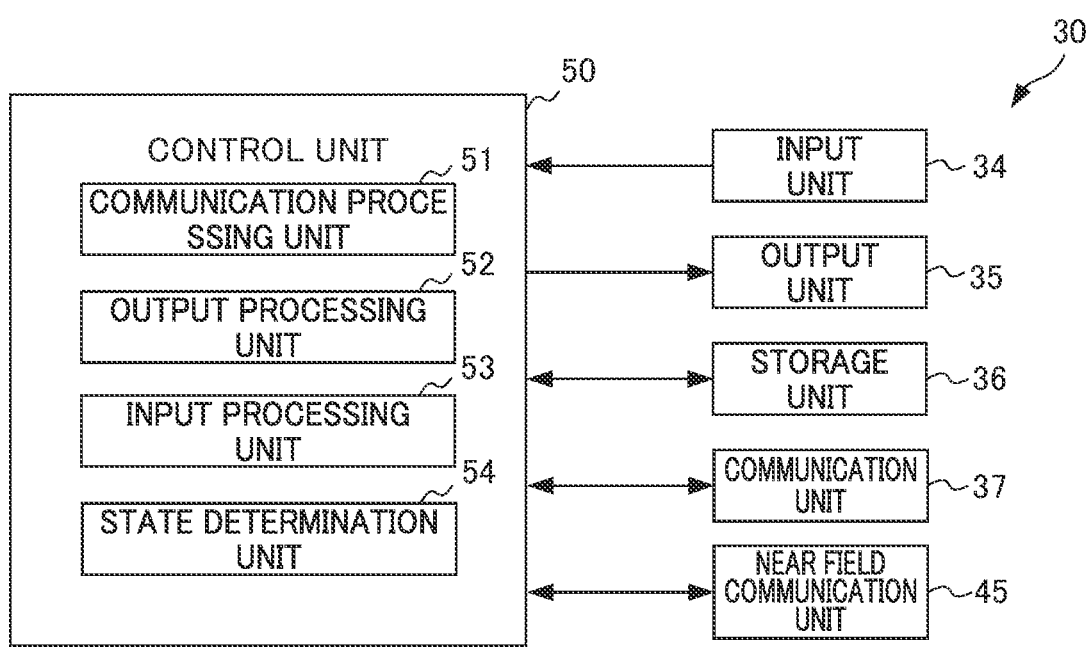
FIG. 3 is a functional block diagram showing part of a functional configuration of the user terminal according to one embodiment.

Next, a functional configuration of the user terminal 30 will be described. FIG. 3 is a functional block diagram showing a functional configuration for the communication processing in the functional configuration of the user terminal 30 according to the embodiment.

A control unit 50 that performs various types of control for the user terminal 30 is implemented by the CPU 31 that executes arithmetic processing.

The control unit 50 of the present embodiment has a communication processing unit (a communication processing function) 51, an output processing unit (an output processing function) 52, an input processing unit (an input processing function) 53, and a state determination unit (a state determination function) 54.

The communication processing unit 51 executes the processing of communicating with external equipment via the communication unit 37, thereby executing the processing of exchanging various types of information with the wearable terminal 60 via the near field communication unit 45.

The output processing unit 52 executes the processing of displaying an image on the output unit 35 of the user terminal 30. For example, the output processing unit 52 executes the processing of displaying, on the output unit 35, text information input by the later-described input processing unit 53.

The input processing unit 53 executes the processing of receiving user's operation of the input unit 34. For example, the input processing unit 53 executes the processing of receiving text information input by a user.

The state determination unit 54 executes the processing of determining the state of a program operated by the control unit 50. Moreover, the state determination unit 54 performs the processing of reflecting, on an image displayed on the output unit 35, incoming notification information indicating that a message has been received from the outside. The incoming notification information is a pop-up that a message title or part of a main text is displayed, for example. In a case where the communication processing unit 51 has received message information from the outside via the communication unit 37, the state determination unit 54 extracts a message title or part of a main text from the message information, thereby generating the incoming notification information. The state determination unit 54 instructs the output processing unit 52 to reflect the generated incoming notification information on an image displayed on the output unit 35. Such processing will be described later.

<Wearable Terminal>

Figure 4:
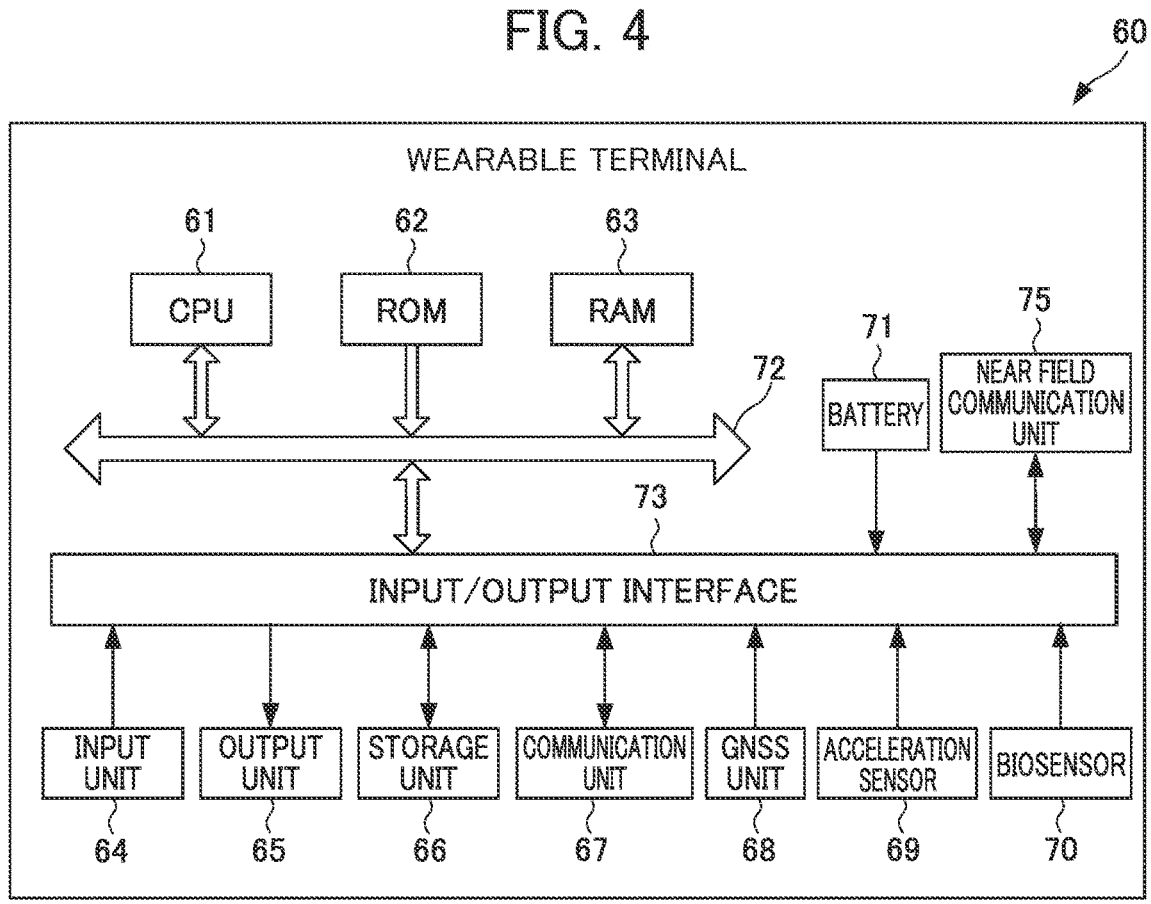
FIG. 4 is a block diagram showing a hardware configuration of the wearable terminal according to one embodiment.

Next, one example of the wearable terminal 60 will be described. FIG. 4 is a block diagram showing a hardware configuration of the wearable terminal 60 according to one embodiment.

The wearable terminal 60 of the present embodiment is a computer including a CPU 61, a ROM 62, a RAM 63, an input unit 64, an output unit 65, a storage unit 66, a communication unit 67, a GNSS unit 68, an acceleration sensor 69, a biosensor 70, a battery 71, a bus 72, an input/output interface 73, and a near field communication unit 75. Note that the same names are given to configurations common or similar to those already described above and detailed description thereof will be omitted in some cases.

The biosensor 70 not included in the user terminal 30 will be described. The biosensor 70 is a biometric information acquisition apparatus that acquires biometric information on the user. The biometric information is information indicating the pulse of the user, whether the wearable terminal 60 contacts the skin of the user, etc.

The biosensor 70 of the present embodiment is arranged on a back surface (a surface contacting the user) side of the wearable terminal 60. For example, the biosensor 70 is of an optical type or a current detection type based on a current. In the case of the optical type, the biosensor 70 irradiates the skin of the user with light to measure reflected light, thereby detecting the user biometric information, for example. In the case of the current detection type, the biosensor 70 directly detects the weak current of the skin of the user to acquire the biometric information, or acquires the biometric information by, e.g., bioelectrical impedance analysis for measuring the pulse by application of weak current to the skin.

Figure 5:
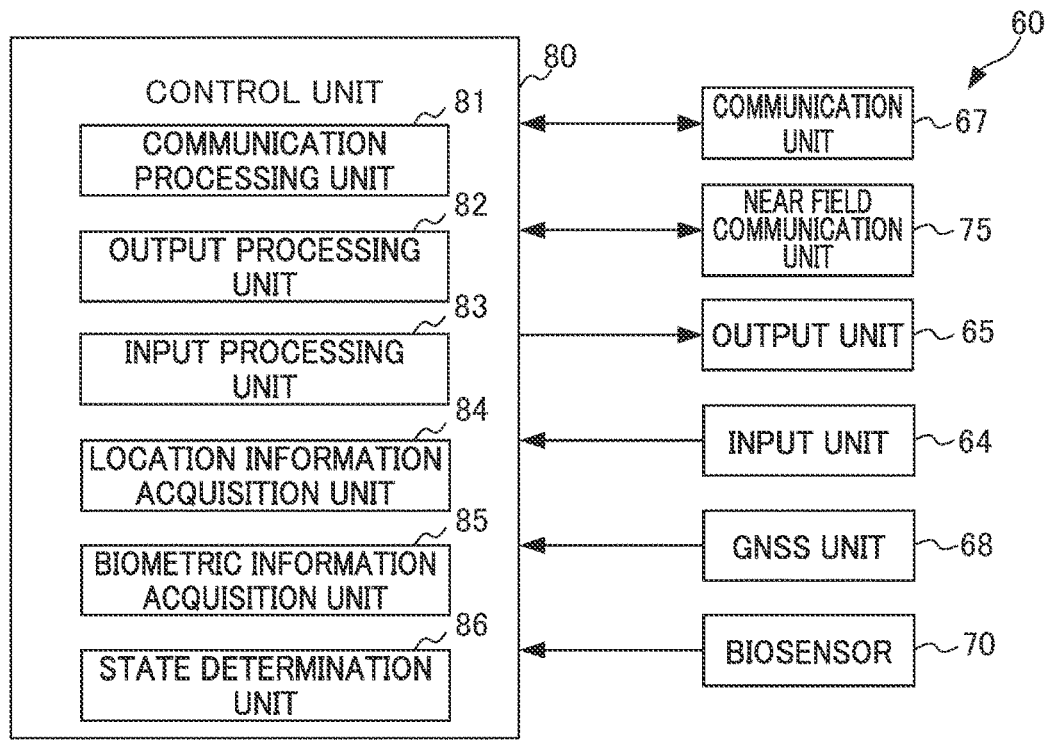
FIG. 5 is a functional block diagram showing part of a functional configuration of the wearable terminal according to one embodiment.

Next, a functional configuration of the wearable terminal 60 will be described. FIG. 5 is a functional block diagram showing part of the functional configuration of the wearable terminal 60 according to one embodiment.

A control unit 80 that performs various types of control for the wearable terminal 60 is implemented by the CPU 61 that executes arithmetic processing. The control unit 80 of the present embodiment has a communication processing unit (a communication processing function) 81, an output processing unit (an output processing function) 82, an input processing unit (an input processing function) 83, a location information acquisition unit (a location information acquisition function) 84, a biometric information acquisition unit (a biometric information acquisition function) 85, and a state determination unit (a state determination function) 86.

The communication processing unit 81 executes the processing of exchanging various types of information with external equipment via the communication unit 67, and executes the processing of exchanging various types of information with the user terminal 30 via the near field communication unit 75.

The output processing unit 82 executes the processing of displaying an image on the output unit 65 of the wearable terminal 60. For example, the output processing unit 82 executes the processing of displaying information acquired from the user terminal 30 or displaying information acquired by the later-described biometric information acquisition unit 85.

The input processing unit 83 executes the processing of receiving user's operation of the input unit 64. For example, the input processing unit 83 executes the processing of switching information to be displayed based on information displayed on the output unit 65.

The location information acquisition unit 84 executes the processing of acquiring second location information indicating the current location of the wearable terminal 60 based on a positioning signal detected by the GNSS unit 68.

The biometric information acquisition unit 85 acquires, based on a signal acquired from the biosensor 70, the biometric information such as information indicating the pulse of the user or information indicating whether the user is wearing the wearable terminal 60.

The state determination unit 86 executes the processing of acquiring information on the state of the program, which is operated by the control unit 50, determined by the state determination unit 54 of the user terminal 30. Moreover, the state determination unit 86 performs the processing of reflecting, on an image displayed on the output unit 65, the incoming notification information received from the user terminal 30. For example, in a case where the communication processing unit 81 has received the incoming notification information from the user terminal 30 via the communication unit 67, the state determination unit 86 instructs the output processing unit 82 to reflect the incoming notification information on an image displayed on the output unit 65. Such processing will be described later.

<Example of Communication Processing>

Next, one example of the communication processing will be described. In the present embodiment, the state determination unit 54 determines the presence or absence of operation of a predetermined program to switch the form of transmission information for the wearable terminal 60 according to the state of the subject unit. The transmission information is one acquired or generated according to a second program different from the predetermined program. The second program is, for example, a mail application or a messenger application for managing an E-mail. The predetermined program is stored in advance as a determination criterion in the storage unit 36.

An example of the predetermined program will be described. The predetermined program may be, for example, application software (hereinafter merely referred to as an "application") or a predetermined state after the start of an application. In other words, the predetermined program may be part of operation (a program) while an application is starting up. For example, a program for displaying the contents of an application on the full screen of the output unit 35 while the application is starting up may be the predetermined program. Alternatively, the predetermined program is not an application, but may be a program to be executed by the subject unit. For example, a program for determining the occupancy of a camera image or video on the screen of the output unit 35 based on a display area may be the predetermined program.

Figure 6:
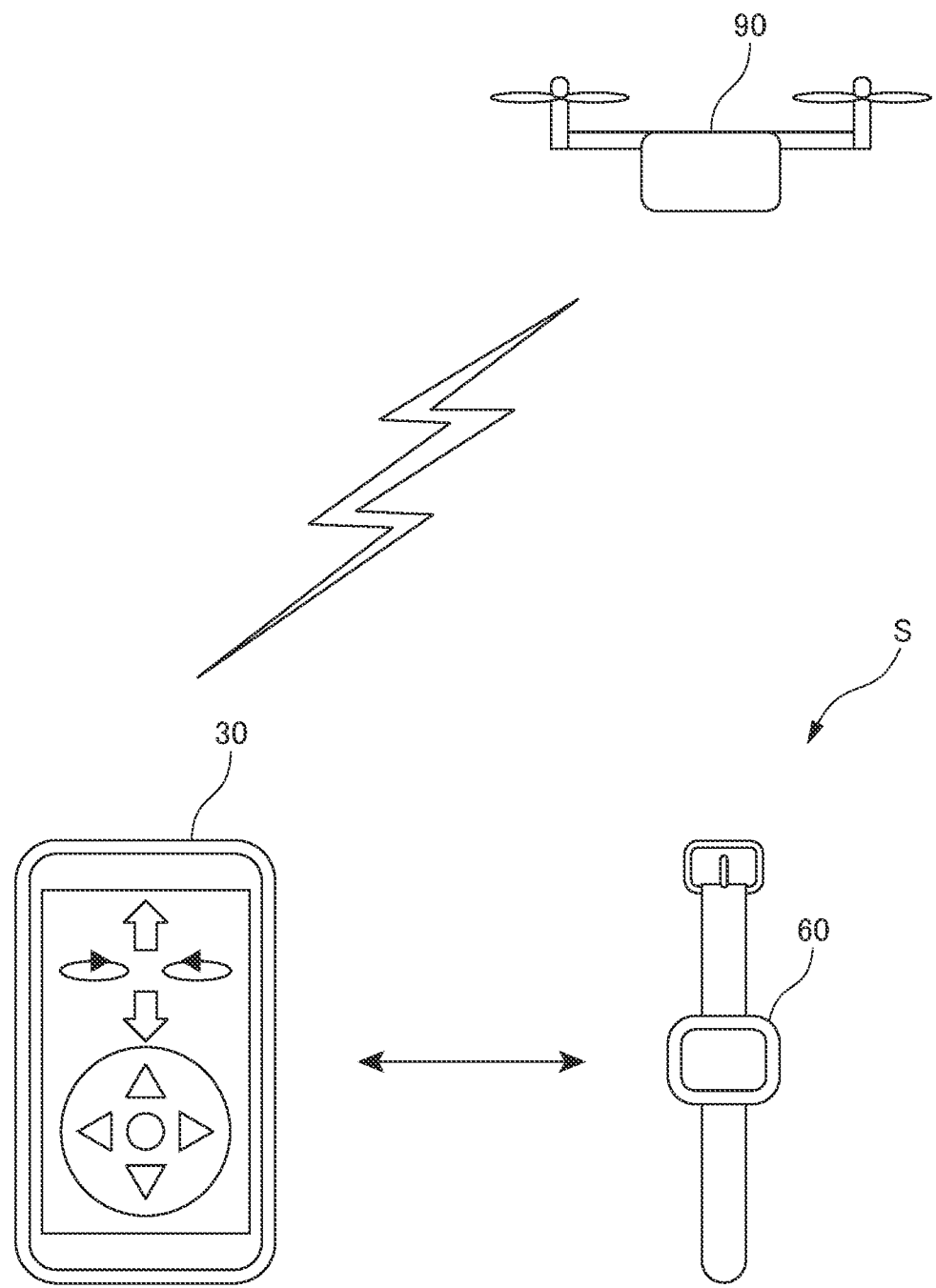
FIG. 6 is a schematic diagram for describing communication processing by the user terminal and the wearable terminal according to one embodiment.

Next, one example of the predetermined program will be described. FIG. 6 is a schematic diagram for describing the communication processing performed by the user terminal 30 and the wearable terminal 60 according to the embodiment. In an example shown in FIG. 6, a steering application as application software for steering a drone 90 is set as the predetermined program.

The drone 90 has a not-shown near field communication unit. The drone 90 can perform near field communication with the user terminal 30 via the near field communication unit. The user is wearing the wearable terminal 60 on one's arm. The user terminal 30 is held by the user. Further, the above-described steering application is installed on the user terminal 30.

When the steering application is started, the output processing unit 52 displays a controller for the drone 90 on the output unit 35. The user touches the controller, thereby steering the drone 90 via near field communication. While the steering application is starting up, the screen of the output unit 35 is occupied by the controller for the drone 90.

Figure 7:
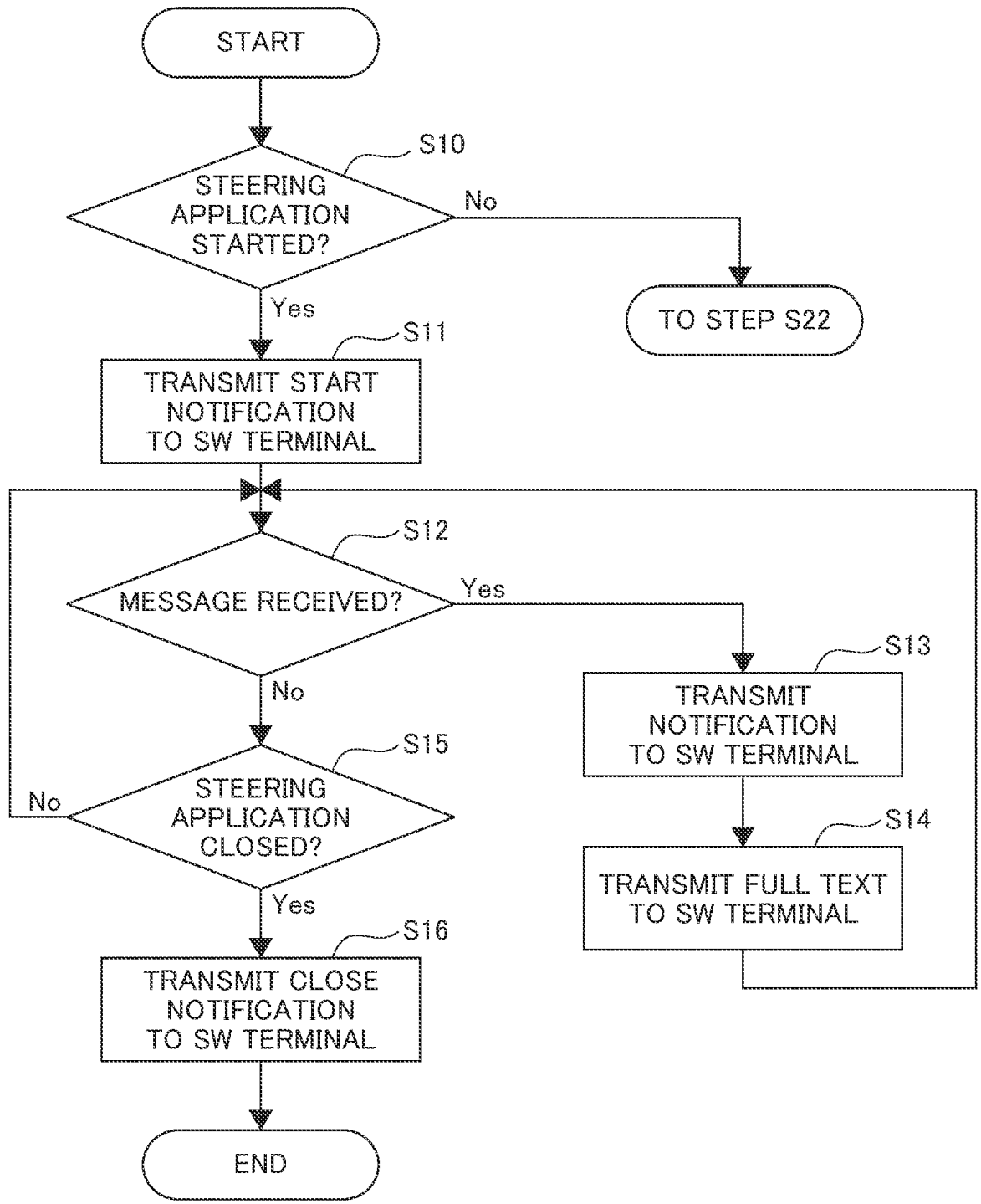
FIG. 7 is a flowchart showing one example of the flow of the communication processing by the user terminal according to one embodiment.
Figure 8:
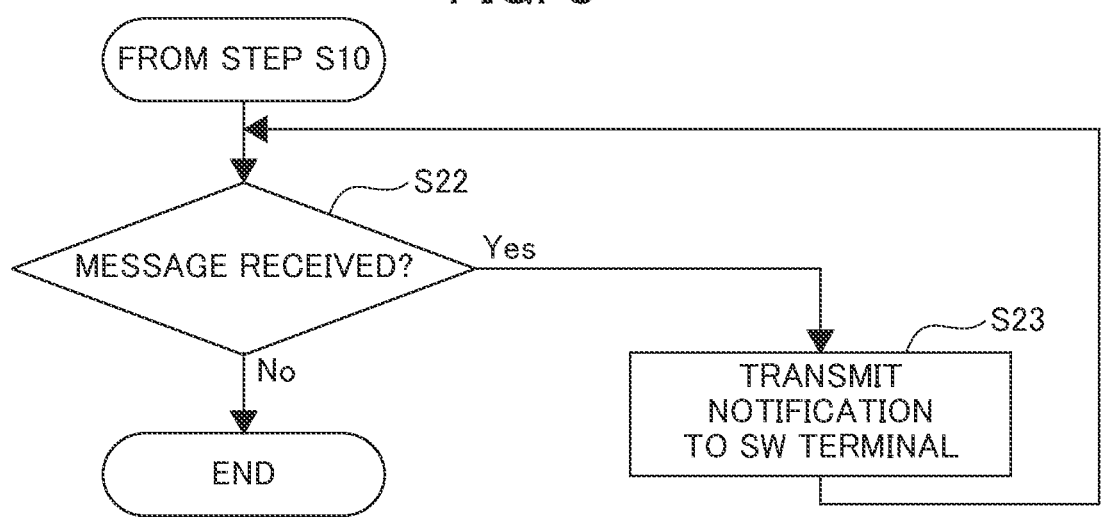
FIG. 8 is a flowchart showing one example of the flow of the communication processing by the user terminal according to one embodiment.
Figure 9:
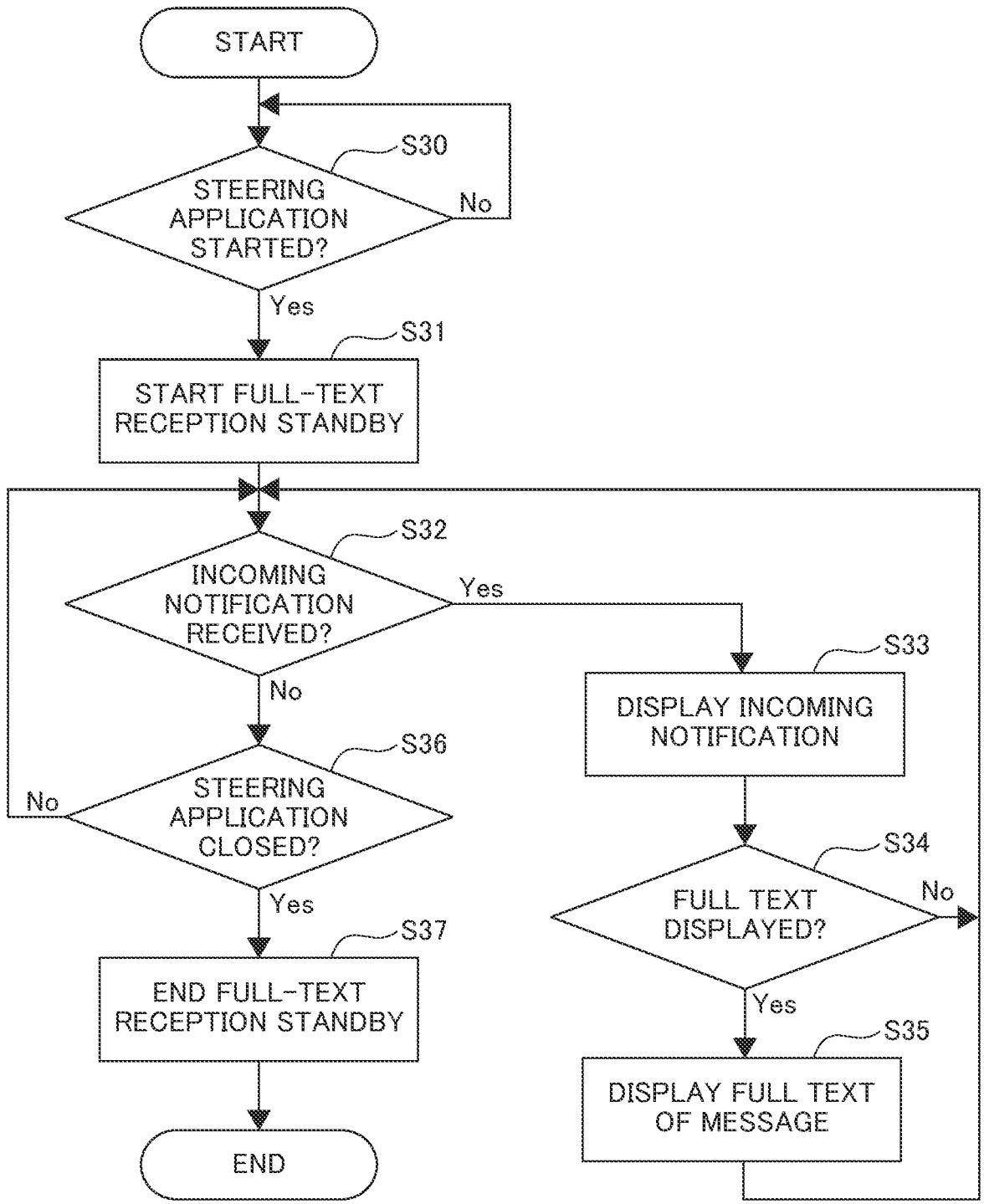
FIG. 9 is a flowchart showing one example of the flow of the communication processing by the wearable terminal according to one embodiment.

The communication processing by the user terminal 30 as a smartphone and the wearable terminal 60 as a smart watch (a SW terminal) in the above-described situation will be described with reference to flowcharts shown in FIGS. 7 to 9. Such communication processing is started by pairing between the user terminal 30 and the wearable terminal 60. FIGS. 7 to 8 show the flowcharts for describing the flow of the communication processing executed by the user terminal 30 having the functional configuration of FIG. 3. FIG. 9 is the flowchart for describing the flow of the communication processing executed by the wearable terminal 60 having the functional configuration of FIG. 5.

First, the processing by the user terminal 30 will be described. As shown in FIG. 7, the state determination unit 54 determines the presence or absence of operation of the steering application by the control unit 50 (Step S10). In a case where operation of the steering application has been confirmed (Step S10: Yes), the state determination unit 54 causes the communication processing unit 51 to transmit notification (hereinafter referred to as application start notification) indicating that the steering application has been started to the wearable terminal 60 (Step S11). Next, the state determination unit 54 determines whether the communication processing unit 51 has received a message from external equipment (Step S12).

In a case where the communication processing unit 51 has received the message from the external equipment (Step S12: Yes), the state determination unit 54 generates the incoming notification information (hereinafter also merely referred to as "notification text information") indicating that the message has been received from the external equipment, and causes the communication processing unit 51 to transmit such information to the wearable terminal 60 (Step S13). Next, the state determination unit 54 transmits information (hereinafter merely referred to as "contents text information") indicating the contents of the received message to the wearable terminal 60 (Step S14), and causes the processing to transition to Step S12.

On the other hand, in a case where the communication processing unit 51 has received no message from the external equipment (Step S12: No), the state determination unit 54 determines whether operation of the steering application has ended (Step S15). In a case where operation of the steering application is not closed (Step S15: No), the state determination unit 54 causes the processing to transition to Step S12. In a case where operation of the steering application has been closed (Step S15: Yes), the communication processing unit 51 transmits notification (hereinafter referred to as an application close notification) indicating that the steering application has been closed to the wearable terminal 60 (Step S16), and the state determination unit 54 ends the communication processing.

Next, a case where operation of the steering application cannot be confirmed at Step S10 will be described. In a case where operation of the steering application cannot be confirmed at Step S10 (Step S10: No), the state determination unit 54 causes the processing to transition to Step S22. Subsequently, the state determination unit 54 determines, as shown in FIG. 8, whether the communication processing unit 51 has received a message from the external equipment (Step S22). In a case where the communication processing unit 51 has received the message from the external equipment (Step S22: Yes), the state determination unit 54 causes the communication processing unit 51 to transmit the notification text information to the wearable terminal 60 (Step S23), and causes the processing to transition to Step S22. In a case where the communication processing unit 51 has received no message from the external equipment (Step S22: No), the state determination unit 54 ends the communication processing.

Next, the processing by the wearable terminal 60 will be described. As shown in FIG. 9, in a case where the communication processing unit 81 has received the application start notification (Step S30: Yes), the output processing unit 82 transitions to a full-text reception standby mode (Step S31). In a case where the output processing unit 82 is executing such a mode, the processing of displaying the contents text information on a screen of the output unit 65 is allowed when the communication processing unit 81 receives the contents text information from the user terminal 30.

Next, the state determination unit 86 determines whether the communication processing unit 81 has received the notification text information (Step S32). In a case where the communication processing unit 81 has received the notification text information (Step S32: Yes), the output processing unit 82 displays, on the output unit 65, an incoming notification of the received message and a selection screen for selecting whether the contents of the received message are to be displayed (Step S33). Note that the displayed selection screen is also the input unit 64 touchable by the user to input the contents to be selected.

In a case where a full-text message is not displayed (Step S34: No), the state determination unit 86 causes the processing to transition to Step S32. In a case where the full-text message is displayed (Step S34: Yes), the output processing unit 82 displays the contents of the message on the output unit 65 (Step S35), and the state determination unit 86 causes the processing to transition to Step S32.

On the other hand, in a case where the communication processing unit 81 has received no notification text information (Step S32: No), the state determination unit 86 determines the presence or absence of the received application close notification (Step S36). In a case where no application close notification has received (Step S36: No), the state determination unit 86 causes the processing to transition to Step S32. In a case where the application close notification has received (Step S36: Yes), the output processing unit 82 ends the full-text reception standby mode (Step S37), and the state determination unit 86 ends the communication processing.

The user terminal 30 configured as described above includes the communication unit 37 that communicates with the wearable terminal 60, and the control unit 50 that performs, for the subject unit, operation determination on whether the predetermined program for outputting an image or sound is operated. Based on an operation determination result, the control unit 50 switches the form of information to be transmitted to the wearable terminal 60 via the communication unit 37, or stops transmission of information to the wearable terminal 60. The information to be transmitted is one acquired or generated according to the second program different from the predetermined program.

With this configuration, the notification contents can be determined according to the status of operation of the program. Moreover, proper information can be transmitted to external electronic equipment according to the status of operation of the program.

In the user terminal 30 according to the present embodiment, the communication processing unit 51 is capable of receiving, from the outside, the message information including at least any one of a text, an image, or sound, and the control unit 50 transmits the message information to the wearable terminal 60 via the communication processing unit 51 in a case where the predetermined program is operated and transmits the incoming notification information indicating that the message information has been received to the wearable terminal 60 via the communication processing unit 51 in a case where the predetermined program is not operated.

With this configuration, the user can check a message, which includes at least any one of a text or an image, on the wearable terminal 60 with the predetermined program being operated in the user terminal 30 when the message is received from the outside in a state in which the predetermined program is operated in the user terminal 30 and the display screen is occupied by such a program. When the message is received in a state in which the predetermined program is not operated, information can be transmitted to the wearable terminal 60 not via a message but an incoming notification, and therefore, power consumption can be further suppressed.

The user terminal 30 according to the present embodiment includes the output unit 35 capable of displaying an image, and the control unit 50 determines that the predetermined program is operated in a case where the screen of the output unit 35 is occupied by such a program.

With such a user terminal 30 according to the present embodiment, it can be determined whether a program operated in the control unit 50 is a program occupying the screen.

In the user terminal 30 according to the present embodiment, the predetermined program steers the drone 90.

With such a user terminal 30 according to the present embodiment, the user can check a message on the wearable terminal 60 with the program for steering the drone 90 being operated when the message is received from the outside in a state in which the program for steering the drone 90 is operated.

The wearable terminal 60 according to the present embodiment includes the communication processing unit 81 that communicates with the user terminal 30, the output unit 65 that displays an image, and the control unit 50 that executes the processing of displaying, on the output unit 65, the display information received from the user terminal 30 via the communication unit 67. In a case where the control unit 50 has received the operation information indicating that the predetermined program is operated in the user terminal 30, the control unit 50 switches the form of information to be displayed based on such operation information.

With this configuration, the received message can be more easily checked without the need for temporarily stopping operation of the predetermined program even in a case where the predetermined program is operated in the user terminal 30 and the display screen is occupied by such a program.

Note that in the present embodiment, the output processing unit 82 of the wearable terminal 60 switches the indication displayed on the output unit 65 to the full text after the notification text information and the contents text information have been transmitted from the communication processing unit 51 of the user terminal 30 to the wearable terminal 60. However, such switching may be made at the timing of transmitting the contents text information from the communication processing unit 51 of the user terminal 30 to the wearable terminal 60.

In the present embodiment, in a case where the user terminal 30 has received a message during operation of the steering application for the drone 90, determination on whether the full text of the received message is to be displayed is made on the wearable terminal 60. However, not the full text of the message but part of the message may be displayed. In the present embodiment, in a case where the user terminal 30 has received a message during operation of the steering application for the drone 90, determination on whether the full text of the received message is to be displayed is made on the wearable terminal 60. However, the processing of directly displaying such a message without determination may be performed.

In the present embodiment, in a case where the user terminal 30 has received a message during operation of the steering application for the drone 90, the contents text information is, in the user terminal 30, transmitted while the communication processing unit 51 is transmitting the notification text information to the wearable terminal 60. However, the contents text information is not necessarily transmitted. In a case where the user terminal 30 has received a message during operation of the steering application for the drone 90, the user terminal 30 may transmit only the contents text information without transmitting the notification text information from the communication processing unit 51 to the wearable terminal 60. In the present embodiment, in a case where the user terminal 30 has received a message during operation of the steering application for the drone 90, switching to the full-text indication is, in the wearable terminal 60, made while the notification text information is displayed. However, only switching to the full-text indication may be made without displaying the notification text information.

In the present embodiment, the received message is a text, but may be information other than a text, such as a figure or sound data. For example, when sound data is received, if the user terminal 30 outputs another type of sound data such as music, the user terminal 30 can transfer the received sound data to the wearable terminal 60, and the wearable terminal 60 can output the sound data. In this case, the predetermined program may be an application for playing the music etc. or a program causing the output unit 35 to output sound while the application is starting up. In the present embodiment, the case during operation of the steering application for the drone 90 has been described, but the present invention is also applicable to an application occupying part or the entirety of the screen of the user terminal 30, such as a voice call application, a video shooting application, a video replay application, or a game application.

<Variation>

In the above-described embodiment, in a case where the user terminal 30 has received a message during operation of the application occupying part or the entirety of the screen of the user terminal 30, the notification text information as the incoming notification information is displayed on the wearable terminal 60. However, an incoming notification non-display mode for not displaying an incoming notification of a message on the screen can be further set for the user terminal 30.

Figure 10:
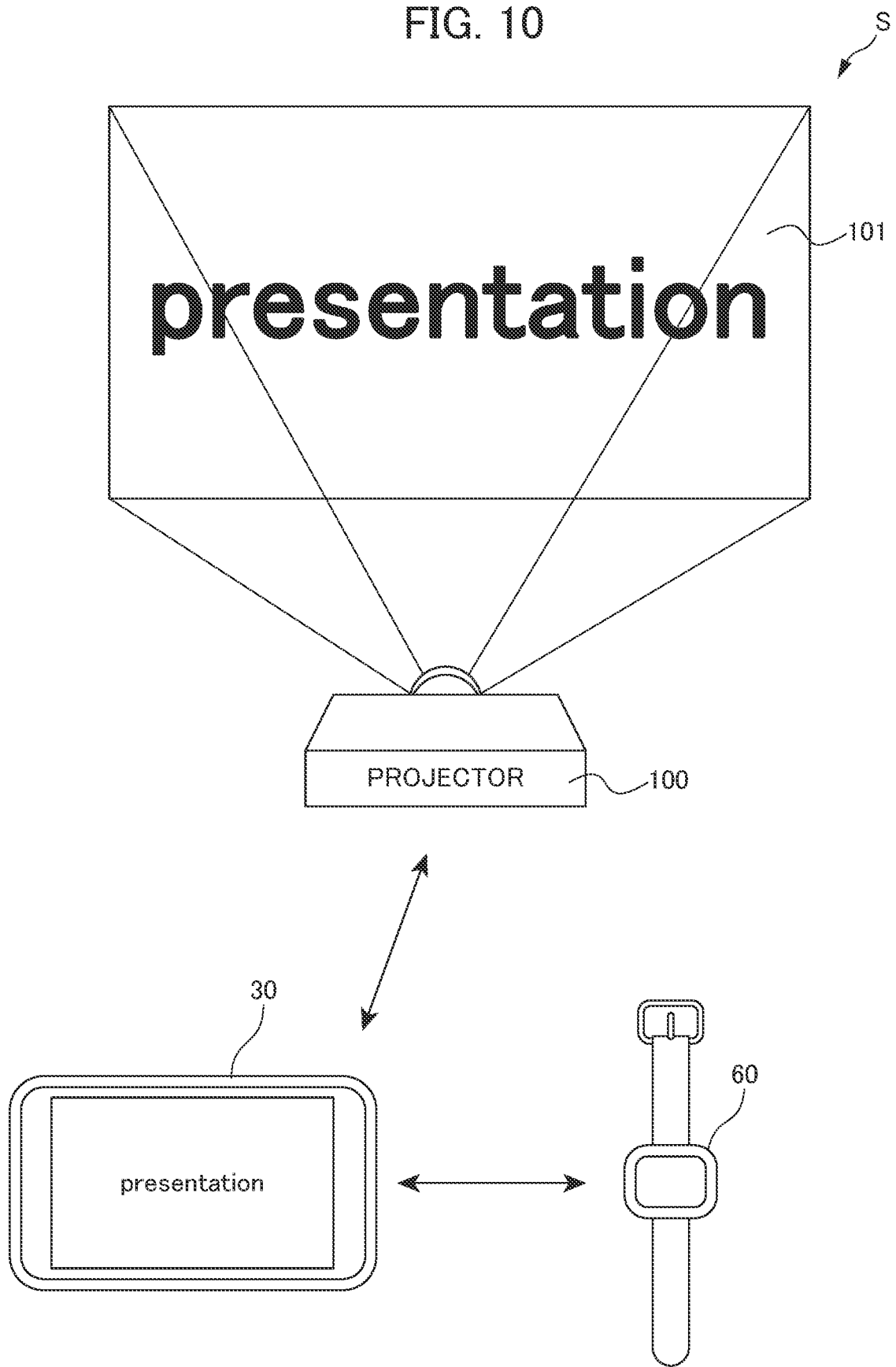
FIG. 10 is a schematic diagram of an information communication system to which a user terminal and a wearable terminal according to a variation are applied.

FIG. 10 is a schematic diagram of an information communication system S to which a user terminal 30 and a wearable terminal 60 according to a variation are applied. The information communication system S according to the variation includes the user terminal 30, the wearable terminal 60, and a projector 100 performing the communication processing and a screen 101. The projector 100 is an apparatus capable of projecting, on the screen 101, an image received from the user terminal 30 via near field communication by pairing with the user terminal 30.

Note that a communication method between the projector 100 and the user terminal 30 is not limited to near field communication and may be a communication method via an information communication network such as a LAN or the Internet. Hardware configurations and functional configurations of the user terminal 30 and the wearable terminal 60 according to the variation are configurations similar to those of the first embodiment, and for this reason, the same names are given to these configurations and detailed description thereof will be omitted.

In an example shown in FIG. 10, the same contents as those of a presentation application displayed on the user terminal 30 are projected on the screen 101 by the projector 100. Thus, in a case where the user terminal 30 has received a message during presentation, an incoming notification indicating a message title or part of a main text is displayed on the screen of the output unit 35.

That is, the incoming notification is also projected on the screen 101 via the projector 100 by operation of a projector projection application of the user terminal 30. Thus, a third party receiving presentation can also view such information via the incoming notification projected on the screen 101, which may result in unintended information being disclosed. For this reason, the user terminal 30 according to the variation has the function of performing the display mode switching processing of switching an incoming notification display mode to a non-display mode in the case of performing projection by the projector projection application. Even in a case where the user terminal 30 has unintentionally received a message during projection by the projector projection application, no incoming notification is displayed on the screen of the output unit 35 because the non-display mode is set. That is, the incoming notification of the message is not projected on the screen 101 via the projector 100.

The user terminal 30 can execute the incoming notification processing of transmitting the incoming notification of the message to the wearable terminal 60, and the wearable terminal 60 can perform the incoming notification processing of displaying the incoming notification on the screen based on the transmitted incoming notification information to provide the user with the incoming notification.

Figure 11:
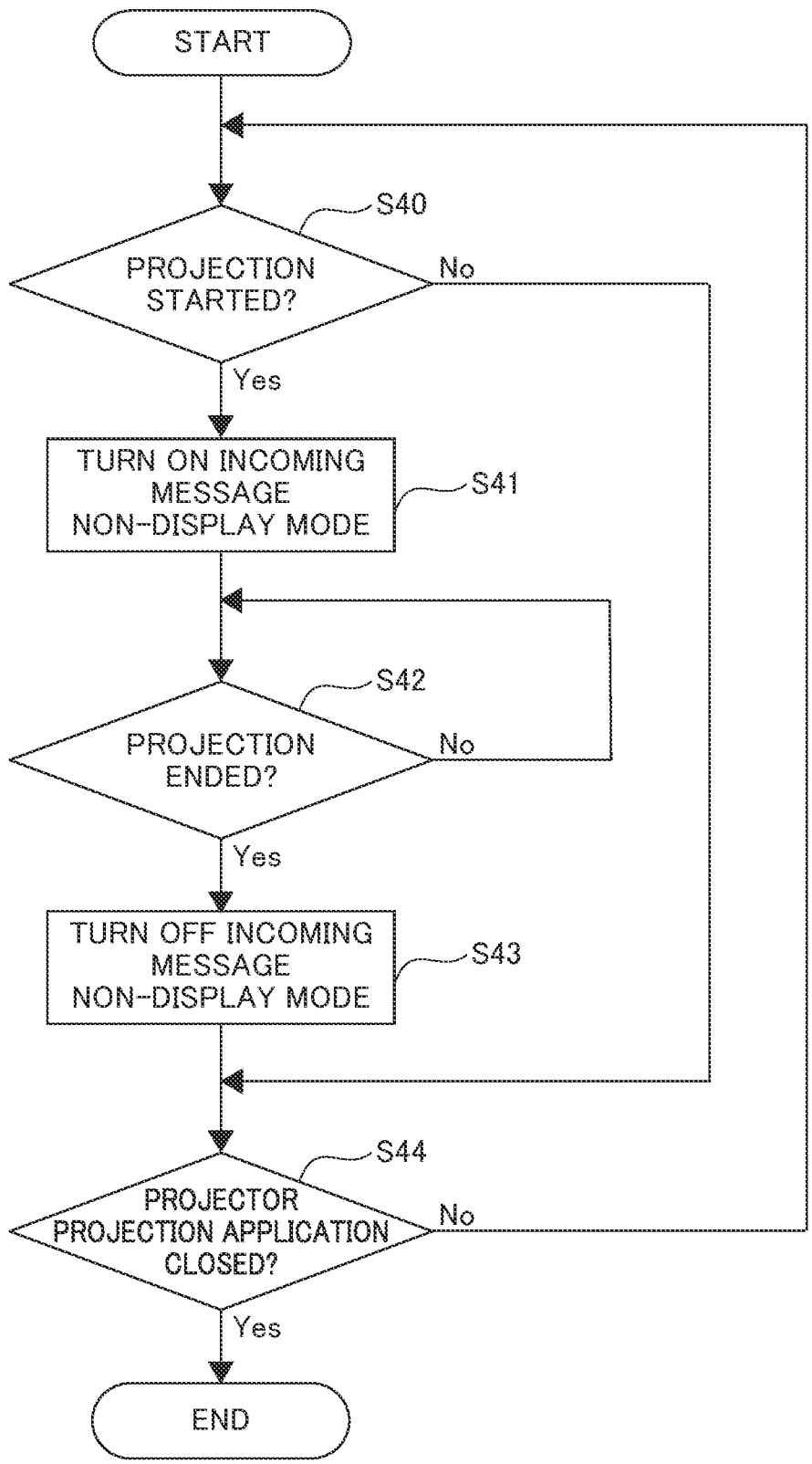
FIG. 11 is a flowchart showing one example of the flow of display mode switching processing by the user terminal according to the variation.

Next, the display mode switching processing executed by the user terminal 30 according to the present variation will be described with reference to FIG. 11. FIG. 11 is a flowchart showing one example of the flow of the display mode switching processing by the user terminal 30 according to the variation. The display mode switching processing is started at such timing that the input processing unit 53 receives projector projection application start operation input to the input unit 34.

First, the state determination unit 54 checks whether the projector projection application has started projection operation (Step S40). In a case where the projector projection application has started the projection operation, the state determination unit 54 sets an incoming message non-display mode to ON (Step S41). Next, the state determination unit 54 checks whether the projector projection application has ended projection (Step S42).

In a case where the projector projection application has ended projection (Step S42: Yes), the state determination unit 54 sets the incoming message non-display mode to OFF (Step S43). Next, the state determination unit 54 checks whether the projector projection application has been closed (Step S44). In a case where the projector projection application is not closed yet (Step S44: No), the state determination unit 54 causes the processing to transition to Step S40. On the other hand, in a case where the projector projection application has been closed (Step S44: Yes), the state determination unit 54 ends the processing.

Figure 12:
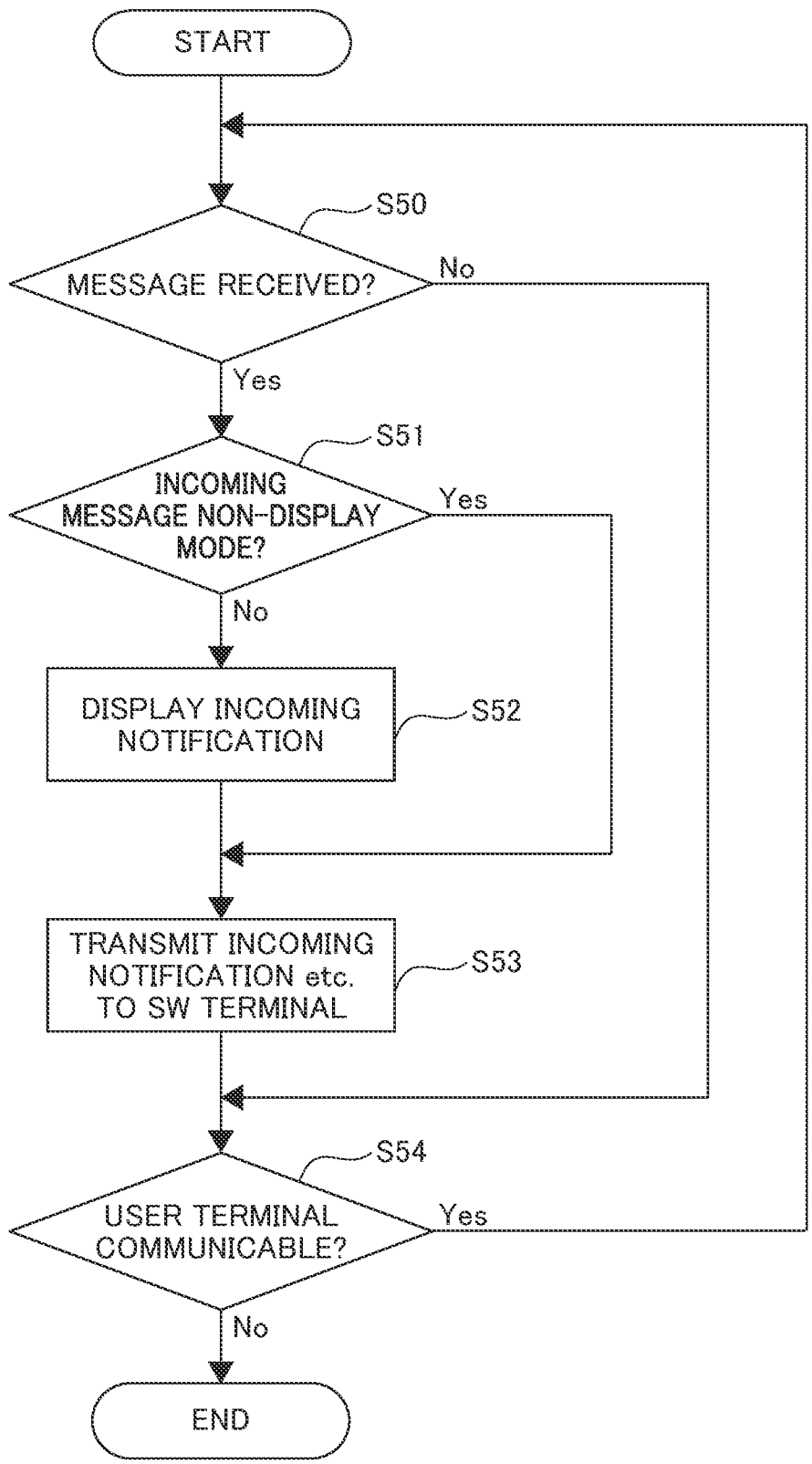
FIG. 12 is a flowchart showing one example of the flow of incoming notification processing by the user terminal according to the variation.

Next, the incoming notification processing executed by the user terminal 30 according to the present variation will be described with reference to FIG. 12. FIG. 12 is a flowchart showing one example of the flow of the incoming notification processing by the user terminal 30 according to the variation. The incoming notification processing is started at such timing that the user terminal 30 becomes a communicable state. One example of the timing at which the user terminal 30 becomes the communicable state is such timing that the user terminal 30 is powered on.

First, the state determination unit 54 checks whether a message has been received (Step S50). Next, the state determination unit 54 checks ON/OFF of the incoming message non-display mode (Step S51). In a case where the incoming message non-display mode is ON (Step S51: Yes), the state determination unit 54 causes the processing to transition to Step S53.

On the other hand, in a case where the incoming message non-display mode is OFF (Step S51: No), the state determination unit 54 instructs the output processing unit 52 to display the incoming notification on the screen of the output unit 35 (Step S52). Next, the state determination unit 54 instructs the communication processing unit 51 to transmit the incoming notification information to the wearable terminal 60 as the smart watch (the SW terminal) via the communication unit 37 (Step S53).

Next, the state determination unit 54 checks whether the user terminal 30 is in the communicable state (Step S54). One example of the user terminal 30 being not in the communicable state is a state in which the user terminal 30 is powered off. In a case where the user terminal 30 is in the communicable state (Step S54: Yes), the state determination unit 54 causes the processing to Step S50. On the other hand, in a case where the user terminal 30 is not in the communicable state (Step S54: No), the state determination unit 54 ends the processing.

Note that the incoming notification processing by the state determination unit 54 according to the variation is not limited to the above-described example. For example, since a main text of a mail is not displayed on the screen of the output unit 35 of the user terminal 30 when the user terminal 30 is in the non-display mode, the state determination unit 54 may transmit, as the full message of the mail, the contents text information to the wearable terminal 60. Note that the incoming notification information for notifying an incoming call on the screen of the output unit 35 is projected on the projector 100, but the main text of the mail is not displayed. When the user terminal 30 is not in the non-display mode, the state determination unit 54 may display the contents text information on the screen of the output unit 35 of the user terminal 30, and information to be transmitted may be limited only to the incoming notification information on a message without transmitting the full text of the message.

The state determination unit 54 according to the variation may transmit the incoming notification information to the wearable terminal 60 when the user terminal 30 is in the non-display mode. The state determination unit 54 does not necessarily transmit the incoming notification information to the wearable terminal 60 when the user terminal 30 is not in the non-display mode. In other words, the state determination unit 54 may stop transmission of information to the wearable terminal 60 in a state in which the projector projection application is not operated.

Figure 13:
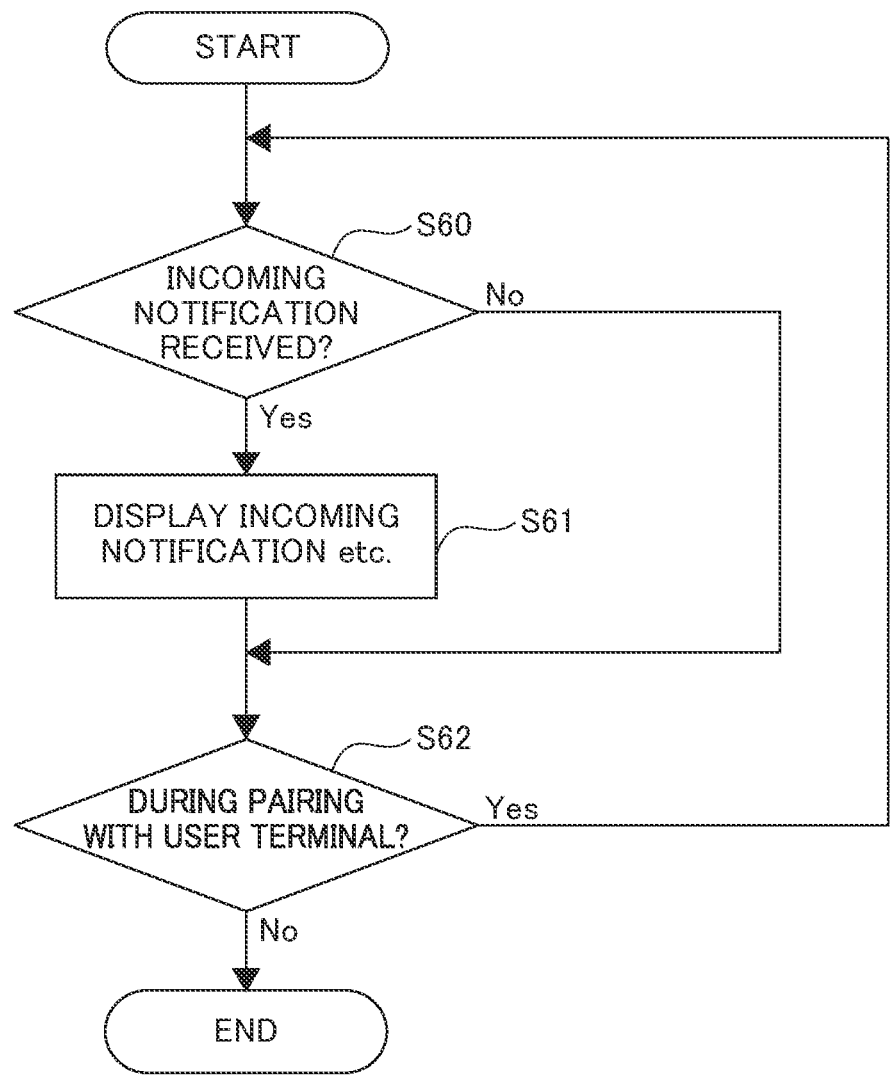
FIG. 13 is a flowchart showing one example of the flow of incoming notification processing by the wearable terminal according to the variation.

Next, the incoming notification processing executed by the wearable terminal 60 according to the present variation will be described with reference to FIG. 13. FIG. 13 is a flowchart showing one example of the flow of the incoming notification processing by the wearable terminal 60 according to the variation. The incoming notification processing is started at such timing that pairing between the wearable terminal 60 and the user terminal 30 is established.

First, the state determination unit 86 checks whether the communication processing unit 81 has received the incoming notification information from the user terminal 30 via the near field communication unit 75 (Step S60). In a case where the communication processing unit 81 does not receive the incoming notification information (Step S60: No), the state determination unit 86 causes the processing to transition to Step S62. On the other hand, in a case where the communication processing unit 81 has received the incoming notification information (Step S60: Yes), the state determination unit 86 instructs the output processing unit 82 to display the incoming notification on the screen of the output unit 65 (Step S61).

Next, the state determination unit 86 checks whether the communication processing unit 81 performs the processing for pairing with the user terminal 30 (Step S62). In a case where the communication processing unit 81 performs the processing for pairing with the user terminal 30 (Step S62: Yes), the state determination unit 86 causes the processing to transition to Step S60. On the other hand, in a case where the communication processing unit 81 does not perform the processing for pairing with the user terminal 30 (Step S62: No), the state determination unit 86 ends the processing.

In the user terminal 30 of the variation configured as described above, the control unit 50 stops transmission of information to the wearable terminal 60 in a state in which the predetermined program is not operated.

With such a user terminal 30 according to the present variation, the information transmission operation itself by the communication unit 37 is stopped when the predetermined program is not operated, and therefore, extra information exchange such as transmission/reception of information to/from the wearable terminal 60 can be omitted.

The user terminal 30 according to the variation includes the output unit 35 capable of displaying an image, and the predetermined program is the projector projection application for performing the processing of displaying an image, which is displayed on the screen of the output unit 35, on the external projector 100.

With such a user terminal 30 according to the present variation, the user can check a message on the wearable terminal 60 with the projector projection application being operated when the message is received from the outside in a state in which the projector projection application is operated, and the information transmission operation itself can be stopped during operation of the projector projection application. Thus, projection of unintended information by the projector can be reduced.

The control unit 50 does not reflect the incoming notification information indicating that a message has been received on an image displayed on the output unit 35 in a state in which the projector projection application is operated, and reflects the incoming notification information on the image displayed on the output unit 35 in a state in which the projector projection application is not operated.

With such a user terminal 30 according to the present variation, the probability of a third party viewing an unintentionally-received message via video etc. projected by the projector when the message is received from the outside can be reduced in a state in which the projector projection application is operated.

Note that in the present variation, the display mode switching processing of switching the display mode to the non-display mode was performed upon execution of the projector projection application, but the present invention is not limited to above and the display mode switching processing of switching the display mode to the non-display mode may be performed upon execution of an application for sharing an image with a third party, such as an online meeting application.

One embodiment and the variation of the present invention have been described above. The present invention is not limited to this embodiment and this variation. The above-described embodiment and the above-described variation may be combined with each other, and the present invention may include variation, modification, etc. made within such a scope that the object of the present invention can be achieved.

The processing at each step described with reference to the above-described flowcharts may be partially omitted, and other steps may be added to or other conditions may be combined with such processing as necessary. For example, both the biometric information and body motion information may be acquired to determine a terminal holding state.

The functional configurations in the present embodiment are implemented by a processor that executes arithmetic processing, and the processor available for the present embodiment includes various processing apparatuses alone such as a single processor, a multiprocessor, and a multicore processor and combinations of these processing apparatuses with processing circuits such as an application specific integrated circuit (ASIC) and a field-programmable gate array (FPGA).

A series of processing described above may be executed by hardware, or may be executed by software. In other words, the functional configurations described above in the embodiment and the variation are merely examples, and are not particularly limited. That is, as long as the function of executing a series of processing described above as a whole is included, the functional blocks for implementing such a function are not particularly limited to use in the embodiment and the variation above. A single functional block may include hardware alone, software alone, or a combination thereof.

In the case of executing a series of processing by software, a program forming such software is installed onto a computer etc. from the Internet or a storage medium. The computer may be a computer incorporated into dedicated hardware. Alternatively, the computer may be a computer capable of executing various functions by installation of various programs, such as a versatile personal computer.

The storage medium including the program may include, for example, not only a storage medium distributed separately from an apparatus body, but also a storage medium provided to a user with the storage medium being incorporated into an apparatus body in advance for providing a program to the user. The steps of describing the program recorded in the storage medium include not only processing performed in a chronological order, but also processing not performed in a chronological order but executed in parallel or separately.

The hardware configurations described in the embodiment and the variation above are merely examples, and the present invention is not particularly limited to these configurations. These configurations may include those including various processing apparatuses alone such as a single processor, a multiprocessor, and a multicore processor, and those implementing functional configurations by using, as a processor, combinations of these processing apparatuses with processing circuits such as an application specific integrated circuit (ASIC) and a field-programmable gate array (FPGA).

EXPLANATION OF REFERENCE NUMERALS

30 User Terminal
50 Control Unit
51 Communication Processing Unit
60 Wearable Terminal
65 Output Unit
80 Control Unit
81 Communication Processing Unit

What is claimed is:

1. An information processing apparatus comprising:
a transceiver that, in operation, receives, from outside of the information processing apparatus, a message including at least one of text data, image data, or sound data, and communicates with external electronic equipment; and
a processor,
wherein the processor, in operation:
performs, for the information processing apparatus, an operation determination on whether a first program for outputting at least an image is operated, wherein the processor is configured to switch, based on a result of the operation determination, a form of data to be transmitted to the external electronic equipment via the transceiver,
transmits the message to the external electronic equipment via the transceiver in a state in which the first program is operated, and
transmits an incoming notification indicating that the message has been received to the external electronic equipment via the transceiver in a state in which the first program is not operated, the incoming notification being different from the message.

2. The information processing apparatus according to claim 1, wherein the data to be transmitted to the external electronic equipment is acquired or generated according to a second program different from the first program.

3. The information processing apparatus according to claim 2, wherein the second program is a mail application or a messenger application.

4. The information processing apparatus according to claim 1, further comprising:
a display,
wherein the processor
determines that the first program is operated in a case where a screen of the display is occupied.

5. The information processing apparatus according to claim 1, wherein the first program steers a drone.

6. The information processing apparatus according to claim 1, further comprising:
a display capable of displaying the image,
wherein the first program performs a processing of displaying the image, which is displayed on a screen of the display, on an external display apparatus.

7. The information processing apparatus according to claim 6, wherein
the processor
does not reflect the incoming notification indicating that the message has been received, on the image displayed on the display in a state in which the first program is operated, and
reflects the incoming notification on the image displayed on the display in a state in which the first program is not operated.

8. The information processing apparatus according to claim 1, wherein the first program is an application software or a program that operates while the application software is starting up.

9. The information processing apparatus according to claim 1, wherein the incoming notification is configured to cause a title or partial text of the message to be displayed.

10. A non-transitory computer-readable storage medium storing a program causing
a computer to execute
a communication function of receiving, from outside of the computer, a message including at least one of text data, image data, or sound data, and communicating with an external electronic equipment,
a control function of performing, for the computer, an operation determination on whether a first program for outputting at least an image is operated,
the control function performing, based on a result of the operation determination, a control of switching a form of information to be transmitted to the external electronic equipment by the communication function, and
a transmission function of transmitting the message to the external electronic equipment in a state in which the first program is operated, and transmitting an incoming notification indicating that the message has been received to the external electronic equipment in a state in which the first program is not operated, the incoming notification being different from the message.

11. An information communication method executed by an information processing apparatus, comprising:
receiving, from outside of the information processing apparatus, a message including at least one of text data, image data, or sound data;
performing, for the information processing apparatus, an operation determination on whether a first program for outputting an image is operated;
switching a form of information to be transmitted to an external electronic equipment based on a result of the operation determination;
transmitting the message to the external electronic equipment in a state in which the first program is operated, and
transmitting an incoming notification indicating that the message has been received to the external electronic equipment in a state in which the first program is not operated, the incoming notification being different from the message.

* * * * *

UNITED STATES PATENT AND TRADEMARK OFFICE
CERTIFICATE OF CORRECTION

| | |
|---|---|
| PATENT NO. | : 12,003,658 B2 |
| APPLICATION NO. | : 17/683092 |
| DATED | : June 4, 2024 |
| INVENTOR(S) | : Fuminobu Nakamura |

Page 1 of 1

It is certified that error appears in the above-identified patent and that said Letters Patent is hereby corrected as shown below:

In the Claims

Column 14, Claim 1, Line 34:
"communicates with external electronic"
Should read:
--communicates with an external electronic--.

Signed and Sealed this
First Day of October, 2024

Katherine Kelly Vidal
*Director of the United States Patent and Trademark Office*